United States Patent
Albus et al.

(10) Patent No.: US 8,044,413 B2
(45) Date of Patent: Oct. 25, 2011

(54) LOUDSPEAKER SYSTEM FOR MOTOR VEHICLES UTILIZING CAVITIES FORMED BY SUPPORTING STRUCTURES

(75) Inventors: Rainer Albus, Dormettingen (DE); Norbert Niemczyk, Pforzheim (DE)

(73) Assignee: Daimler AG, Stuttgart (DE)

( * ) Notice: Subject to any disclaimer, the term of this patent is extended or adjusted under 35 U.S.C. 154(b) by 880 days.

(21) Appl. No.: 12/088,365

(22) PCT Filed: Feb. 15, 2006

(86) PCT No.: PCT/EP2006/001350
§ 371 (c)(1),
(2), (4) Date: Mar. 27, 2008

(87) PCT Pub. No.: WO2007/036245
PCT Pub. Date: Apr. 5, 2007

(65) Prior Publication Data
US 2008/0247564 A1    Oct. 9, 2008

(30) Foreign Application Priority Data
Sep. 28, 2005 (DE) .......................... 10 2005 046 594

(51) Int. Cl.
*H04B 1/00* (2006.01)
(52) U.S. Cl. ........................................................ 257/86
(58) Field of Classification Search ............ 381/86, 381/87, 389, 302, 338, 386, 89, 307, 332, 381/335; 181/199, 141; 463/42
See application file for complete search history.

(56) References Cited

U.S. PATENT DOCUMENTS

| | | | | |
|---|---|---|---|---|
| 4,924,962 A | * | 5/1990 | Terai et al. ..................... | 181/141 |
| 5,612,516 A | * | 3/1997 | Valitutti et al. ............... | 181/141 |
| 6,310,958 B1 | | 10/2001 | Eisner | |
| 6,868,937 B2 | * | 3/2005 | Cass ............................ | 181/192 |

FOREIGN PATENT DOCUMENTS

| | | |
|---|---|---|
| DE | 19735082 A1 | 2/1999 |
| DE | 19909143 A1 | 11/2000 |
| DE | 10353578 * | 6/2005 |
| DE | 10353578 A1 | 6/2005 |
| EP | 1519617 A2 | 3/2005 |
| FR | 2774351 A1 | 8/1999 |

(Continued)

*Primary Examiner* — Dao Nguyen
*Assistant Examiner* — Tram H Nguyen
(74) *Attorney, Agent, or Firm* — Patent Central LLC; Stephan A. Pendorf

(57) ABSTRACT

In order to produce a powerful bass, bass boxes require a relatively large installation volume, for which insufficient space is frequently available in the interior of a motor vehicle, in particular in a passenger motor vehicle. When drivers and front-seat passengers require the sound installation to have a powerful bass, a bass box requires a volume in the order of magnitude of at least 10 to 15 liters. In order to restrict the physical space which is required for this purpose in the vehicle interior, the active sound transducer of the loudspeaker system is acoustically coupled on its rear face to a resonant area which is formed at least in parts by the cavity within a supporting structure of the vehicle. In this case, the sound transducer is acoustically coupled in the area surrounding an area of the vehicle in which at least two elements of the supporting structure meet one another, such that at least a portion of the resonant area is jointly formed by the cavities in these at least two elements of the supporting structure.

8 Claims, 2 Drawing Sheets

FOREIGN PATENT DOCUMENTS

Figure 1:
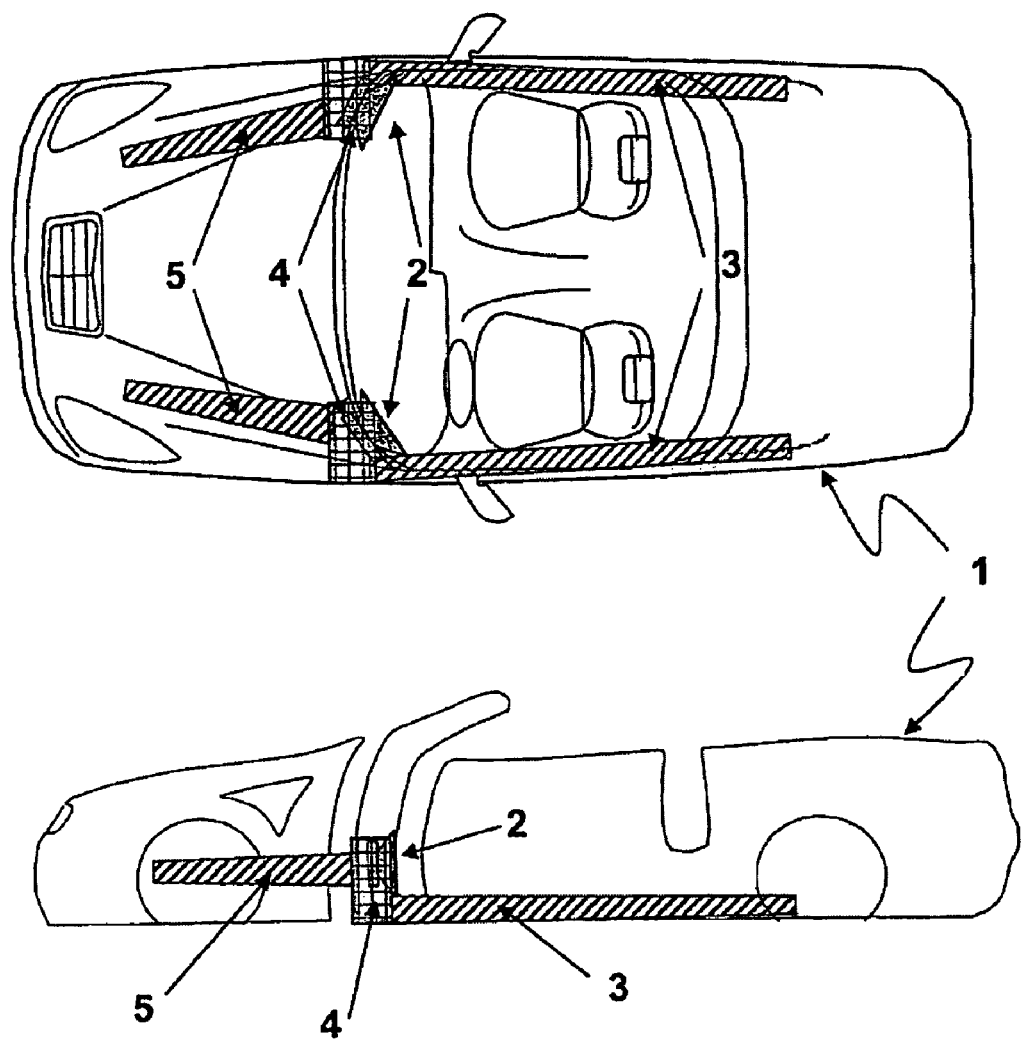

| | | |
|---|---|---|
| JP | 62103648 U1 | 5/1987 |
| JP | 63125095 A1 | 5/1988 |
| JP | 4002754 U1 | 1/1992 |
| JP | 2001518035 A1 | 10/2001 |
| WO | 9842536 A1 | 10/1998 |

* cited by examiner

LOUDSPEAKER SYSTEM FOR MOTOR VEHICLES UTILIZING CAVITIES FORMED BY SUPPORTING STRUCTURES

The invention relates to a loudspeaker system for vehicles utilizing the cavities formed by supporting structures, as claimed in the precharacterizing clause of patent claim 1.

A sound installation which, for example, has a radio, a cassette player and a CD player is normally already installed as a standard or as special equipment in a motor vehicle. In addition, a better sound installation comprises a speaker system which has tweeters and woofers, so-called bass boxes.

In order to produce a powerful bass, bass boxes require a relatively large installation volume, for which insufficient space is frequently available in the interior of a motor vehicle, in particular in a passenger motor vehicle. When drivers and front-seat passengers require the sound installation to have a powerful bass, a bass box requires a volume in the order of magnitude of at least 10 to 15 liters. Bass boxes of this size are normally accommodated in the footwell or in the trunk area of the vehicle, where the result is often, however, a corresponding loss of useful area. A bass box arranged in the footwell or trunk area also requires an additionally greater volume in order to allow the desired sound to be produced for the driver and the front-seat passenger.

In order to minimize the resonant volume of a bass box to be introduced into the free space in the vehicle, German Laid-Open Specification DE 197 35 082 A1 proposes that a loudspeaker box which is coupled to the rear face of the loudspeaker and has a relatively small extent be fitted to the sillboard volume, which is surrounded by a supporting frame, and that these two volumes be acoustically coupled via an aperture opening. In order to increase the resonant volume beyond the volume of the sillboard, the document provides for the sillboard volume to be connected to the surrounding area through diffusion openings. This results in the resonant volume being formed by the rear area of the loudspeaker, the sillboard volume and the surrounding volume adjacent thereto.

Another refinement for equipping a bass loudspeaker arranged under the vehicle seat with an enlarged resonant volume is described in German Patent DE 699 07 412 T2, which proposes that the floor under the vehicle seat be provided with an intermediate floor and a volume which can be associated with the base loudspeaker and is then acoustically coupled to it be compartmentalized off in this area.

The object of the invention is to find a further option for creating a loudspeaker system with a large-volume resonant area for a motor vehicle.

The object is achieved by a loudspeaker system having the features of patent claim 1. Advantageous developments and refinements of the invention are described by the dependent claims.

The loudspeaker system for a vehicle has at least one active sound transducer (2) which is aligned integrally in the loudspeaker system such that the sound produced by it is emitted into the interior of the motor vehicle. In this case, the sound transducer (2) is acoustically coupled on its rear face to a resonant area which is formed at least in parts by the cavity within a supporting structure of the vehicle (1). According to the invention, the sound transducer (2) is acoustically coupled in the area surrounding an area of the vehicle (1) in which at least two elements (3,4,5) of the supporting structure meet one another, such that at least a portion of the resonant area is jointly formed by the cavities in these at least two elements (3,4,5) of the supporting structure.

In a particularly advantageous manner, the inventive positioning of the sound transducer (2) results in the volumes of a plurality of structural elements (3,4,5) being acoustically coupled to it at the same time, as a resonant area.

In this case, on the one hand, the acoustic coupling can be provided in such a manner, that it results in the rear face of the sound transducer (2) extending directly into the internal volume of a plurality of elements (3,4,5) of the supporting structure, or else in only one volume of the supporting structure making direct contact with the rear wall of the sound transducer (2), and in the other volumes being acoustically connected to this supporting structure, coupled to this volume.

In a further advantageous refinement of the invention, it would also be possible for the volumes of a plurality of supporting structures (3,4,5) to be acoustically coupled to one another via a channel or via an area (8) connecting these volumes. In this case, the rear wall of the sound transducer (2) would extend into this channel or area (8), and thus couple the sound transducer (2) to the volume in the supporting, structures. Such coupling of the sound transducer (2) via an area (8) or a channel is particularly worthwhile when it is not possible to produce direct contact with the elements (3,4,5) of the supporting structure at the intended installation position, in particular as a result of the vehicle internal cladding (for example: end wall (9)).

Figure 2:
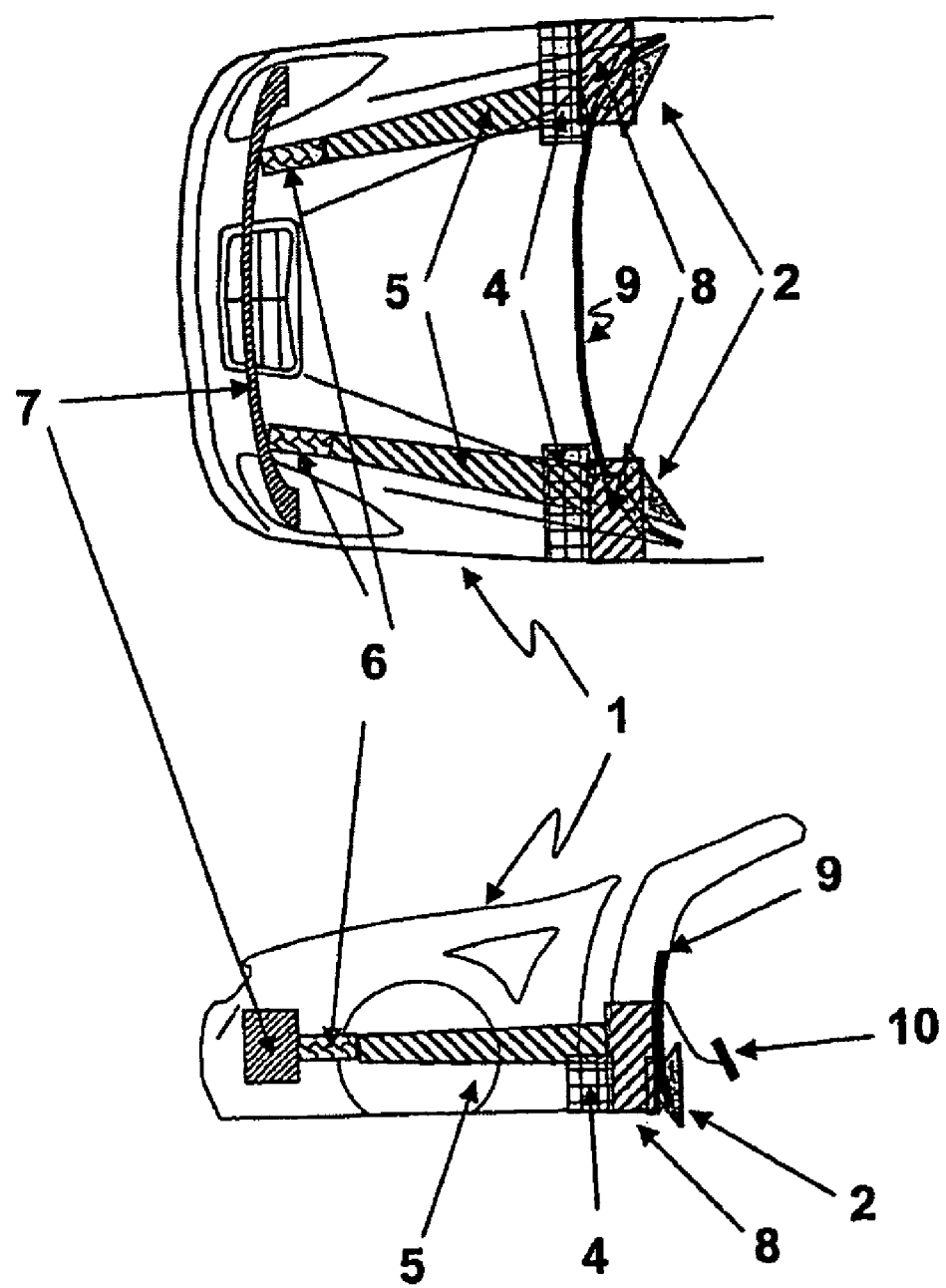

The invention will be described in detail in the following text with reference to figures, in which:

FIG. 1 shows a plan view and end view of a vehicle (1) in which the sound transducer (2) is coupled to longitudinal supporting (5), transverse supporting (4) and sill board volume (3), FIG. 2 shows a plan view and side view of the front of a vehicle (1) with the sound transducer (2) being coupled to the volumes of a plurality of elements of the supporting structure via an area (8).

FIG. 1 shows, schematically, a plan view and side view of a vehicle (1) in which the sound transducer (2) is coupled in the footwells of the driver and front-seat passenger seats. In this case, the installation position of the sound transducer (2) is chosen such that its injection point is in the area in which the longitudinal supporting (5), transverse supporting (4) and sillboard volumes (3) coincide. Depending on the technical configuration of the basic structure of the vehicle (1), it would now on the one hand be feasible, to design the opening through which the sound transducer (2) is introduced into the volumes of the elements (3,4,5) of the supporting structure such that it engages at the same time in the walls of a plurality of the elements (3,4,5), or else on the other hand such that the opening engages only in a single one of the volumes of the elements (3,4,5) with the other volumes being connected to this one volume through an acoustically acting aperture opening. This last situation, is illustrated in FIG. 1. In this case, the sound transducer (2) is incorporated directly in the volume of the transverse support (4) via an opening. The volumes of the longitudinal support (5) and of the sillboard (3) are connected to the transverse support, acoustically coupled via aperture openings. This provides the sound transducer (2) with a resonant volume which is formed jointly by a plurality of elements (3,4,5) of the support structure of the vehicle (1), and therefore has a total volume of more than 15 liters.

Alternatively, it is particularly advantageous to couple the volumes of the longitudinal support, end wall transverse support and pedal transverse support to one another thus also allowing a resonant volume in the range from 13 to 15 liters to be achieved in this case. It is advantageous to couple these elements of the supporting structure particularly since they are generally quite closely adjacent to one another, so that their volumes can be jointly acoustically coupled relatively easily.

FIG. 2 shows a variant of the refinement of the invention already illustrated in FIG. 1. Since the end wall (9) is, by virtue of the design, at a greater distance, from the elements of the supporting structure (4,5), when the sound transducer (2) is installed, it is necessary to insert it, for acoustic coupling to the volumes of the elements (4,5), into an area (8) or acoustic channel which is connected to them.

The resonant volume associated with the sound transducer (2) can additionally advantageously be enlarged if the cavities in the elements (4,5,6) which are essentially directly acoustically coupled to the sound transducer (2) are at least partially acoustically coupled to cavities in further elements (6,7) of the supporting structure of the vehicle at points which are remote from this coupling point. For example, this means that it would be feasible, as shown in FIG. 2, to acoustically couple the cavity volume of the longitudinal support (5) via suitable aperture openings to the cavity volume of the bending, transverse support (6) and/or of the front transverse support (7).

The coupling point of the sound transducer to the cavity within the supporting structure (3,4,5) and/or to the guided acoustic channel (8) is particularly advantageously located in the area of the end wall of the footwell of the vehicle driver or front seat passenger, or in the area of the wheelbox. Since the invention avoids the need to provide a separate loudspeaker box, which can be associated with the sound transducer (2) and can be accommodated in the free space in the vehicle interior, this integration in the footwell does not lead to any adverse affect for the vehicle occupants or for the pedals which may be located there. In this case, the sound transducer and its cover can be protected particularly advantageously against damage, in particular from being kicked when the coupling point of the sound transducer (2) is located behind the pedals (10), where the motor vehicle driver cannot see it.

The invention claimed is:

1. A loudspeaker system for a motor vehicle, the motor vehicle having as a frame a supporting structure comprised of joined hollow elements each having an internal volume, the loudspeaker system having
   at least one active sound transducer which is aligned integrally in the loudspeaker system such that the sound produced by it is emitted into the interior of the motor vehicle, the sound transducer being acoustically directly coupled on its rear face to a resonant area which is formed at least in parts by the cavity within
   at least two hollow elements of the supporting structure joining one another such that at least a portion of the resonant area is jointly formed by the cavities in these at least two hollow elements of the supporting structure.

2. A loudspeaker system for a motor vehicle, the motor vehicle having as a frame a supporting structure comprised of joined hollow elements each having an internal volume, the loudspeaker system having at least one active sound transducer which is aligned integrally in the loudspeaker system such that the sound produced by it is e3mitted into the interior of the motor vehicle, the sound transducer being acoustically directly coupled on its rear face to a resonant area which is formed at least in parts by the cavity within at least two hollow elements of the supporting structure joining one another such that at least a portion of the resonant area is jointly formed by the cavities in these at least two hollow elements of the supporting structure, wherein the cavities in the elements of the supporting structure are at least partially acoustically coupled at points which are remote from the coupling point of the sound transducer to cavities in further elements in the supporting structure of the vehicle.

3. The loudspeaker system as claimed in claim 2, wherein the cavities in the transverse support of the vehicle and the cavity in the bending transverse support and/or the front transverse support are acoustically coupled to one another.

4. The loudspeaker system as claimed in claim 1, wherein the sound transducer is coupled to the cavity within the supporting structure via a guided acoustic channel.

5. The loudspeaker system as claimed in claim 1, wherein the point at which the sound transducer is coupled to the cavity within the supporting structure and/or to the guided acoustic channel is located in the area of the end wall of the footwell of the motor vehicle driver or of the front-seat passenger, or in the area of the wheelbox.

6. The loudspeaker system as claimed in claim 5, wherein the vehicle has pedals, and wherein the coupling point is located behind the pedals, where the motor vehicle driver cannot see it.

7. The loudspeaker system as claimed in claim 1, wherein the rear face of the sound transducer extends directly into the internal volume of a plurality of elements of the supporting structure.

8. The loudspeaker system as claimed in claim 1, wherein the rear face of the sound transducer extends directly into only one volume of the supporting structure making direct contact with the rear wall of the sound transducer, said one volume being acoustically connected to two at least one other hollow elements of the supporting structure such that at least a portion of the resonant area is jointly formed by the cavities in these at least two hollow elements of the supporting structure.

* * * * *